United States Patent
Proksch et al.

(10) Patent No.: US 10,337,890 B2
(45) Date of Patent: Jul. 2, 2019

(54) INTEGRATED MICRO ACTUATOR AND LVDT FOR HIGH PRECISION POSITION MEASUREMENTS

(71) Applicants: Oxford Instruments PLC, Oxfordshire (GB); Oxford Instruments AFM Inc, Pleasanton, CA (US)

(72) Inventors: Roger Carlos Proksch, Santa Barbara, CA (US); Dan Bocek, Santa Barbara, CA (US); Jason Cleveland, Ventura, CA (US); Matthew Longmire, Santa Barbara, CA (US); Matthew Klonowski, Santa Barbara, CA (US)

(73) Assignee: Oxford Instruments AFM Inc, Pleasanton, CA (US)

( * ) Notice: Subject to any disclaimer, the term of this patent is extended or adjusted under 35 U.S.C. 154(b) by 90 days.

(21) Appl. No.: 15/377,458

(22) Filed: Dec. 13, 2016

(65) Prior Publication Data
US 2017/0089733 A1 Mar. 30, 2017

Related U.S. Application Data

(60) Division of application No. 13/959,943, filed on Aug. 6, 2013, now Pat. No. 9,518,814, which is a continuation of application No. 12/587,947, filed on Oct. 14, 2009, now Pat. No. 8,502,525.

(60) Provisional application No. 61/195,983, filed on Oct. 14, 2008.

(51) Int. Cl.
| | |
|---|---|
| G01B 7/14 | (2006.01) |
| G01D 5/22 | (2006.01) |
| G01Q 10/04 | (2010.01) |
| H01F 21/04 | (2006.01) |

(52) U.S. Cl.
CPC ............ *G01D 5/2291* (2013.01); *G01B 7/14* (2013.01); *G01Q 10/04* (2013.01); *H01F 21/04* (2013.01)

(58) Field of Classification Search
CPC .. G01D 5/2291; G01D 5/2066; G01D 5/2046; G01D 5/2053; G01Q 10/04; G01B 7/14; G01B 7/003
See application file for complete search history.

(56) References Cited

U.S. PATENT DOCUMENTS

| | | | |
|---|---|---|---|
| 2,364,237 | A | 12/1944 | Neff |
| 2,452,862 | A | 11/1948 | Neff |
| 2,503,851 | A | 4/1950 | Snow |
| 4,030,085 | A | 6/1977 | Ellis et al. |

(Continued)

OTHER PUBLICATIONS

Analog-to-digital converter, http://en.wikipedia.org/wiki/Analog_to_digital_converter, Wikipedia the free encyclopedia printed May 20, 2006, 8 pages.

*Primary Examiner* — Minh N Tang
(74) *Attorney, Agent, or Firm* — Law Office of Scott C Harris, Inc

(57) ABSTRACT

A single housing with a non-ferromagnetic piezo-driven flexure has primary and secondary coil forms of different diameters, one coaxially inside the other, integrated in the flexure. The cylinders defining the planes of the primary and secondaries do not spatially overlap. The secondary coil forms may be wound in opposite directions and wired to provide a transformer device. Movement of the primary relative to the secondaries in the direction of the central axis of the coils can be differentially detected with high precision.

14 Claims, 5 Drawing Sheets

(56) References Cited

U.S. PATENT DOCUMENTS

| | | |
|---|---|---|
| 4,222,103 A | 9/1980 | Chamberlin |
| 4,339,714 A | 7/1982 | Ellis |
| 4,634,126 A | 1/1987 | Kimura |
| 4,646,083 A | 2/1987 | Woods |
| 4,669,300 A | 6/1987 | Hall et al. |
| 4,705,971 A | 11/1987 | Nagasaka |
| 4,754,220 A | 6/1988 | Shimizu et al. |
| 4,771,630 A | 9/1988 | Croce et al. |
| 4,857,919 A | 8/1989 | Braswell |
| 5,109,675 A | 5/1992 | Hwang |
| 5,172,002 A | 12/1992 | Marshall |
| 5,223,707 A | 6/1993 | Bjork |
| 5,327,030 A | 7/1994 | Devito et al. |
| 5,412,980 A | 5/1995 | Elings et al. |
| 5,414,939 A | 5/1995 | Waugaman |
| 5,461,319 A | 10/1995 | Peters |
| 5,465,046 A | 11/1995 | Campbell et al. |
| 5,469,053 A | 11/1995 | Laughlin |
| 5,477,473 A | 12/1995 | Mandl et al. |
| 5,513,518 A | 5/1996 | Lindsay |
| 5,606,252 A | 2/1997 | Gschossmann et al. |
| 5,656,769 A | 8/1997 | Nakano et al. |
| 5,705,741 A | 1/1998 | Eaton et al. |
| 5,714,682 A | 2/1998 | Prater et al. |
| 5,739,686 A | 4/1998 | Naughton et al. |
| 5,767,670 A | 6/1998 | Maher et al. |
| 5,777,468 A | 7/1998 | Mahler |
| 5,805,448 A | 9/1998 | Lindsay et al. |
| 5,833,634 A | 11/1998 | Laird et al. |
| 5,948,972 A | 9/1999 | Samsavar et al. |
| 6,267,005 B1 | 7/2001 | Samsavar et al. |
| 6,466,673 B1 | 10/2002 | Hardy |
| 6,530,268 B2 | 3/2003 | Massie |
| 6,639,759 B2 | 10/2003 | Inoguchi et al. |
| 6,707,540 B1 | 3/2004 | Lehman et al. |
| 7,038,443 B2 | 5/2006 | Proksch et al. |
| 8,269,485 B2 | 9/2012 | Bocek et al. |
| 8,502,525 B2 * | 8/2013 | Proksch ............... G01Q 10/04 324/207.18 |
| 8,505,525 B2 | 8/2013 | Proksch |
| 2002/0175677 A1 | 11/2002 | Proksch et al. |
| 2004/0227535 A1 | 11/2004 | Kobayashi et al. |
| 2006/0186876 A1 | 8/2006 | Proksch et al. |
| 2007/0200559 A1 | 8/2007 | Proksch et al. |

\* cited by examiner

INTEGRATED MICRO ACTUATOR AND LVDT FOR HIGH PRECISION POSITION MEASUREMENTS

CROSS-REFERENCE OF RELATED APPLICATION

This application is a divisional application of application Ser. No. 13/959,943, filed Aug. 6, 2013; now U.S. Pat. No. 9,518,814; which is a continuation of U.S. Ser. No. 12/587,947 filed Oct. 14, 2009, now U.S. Pat. No. 8,502,525 issued Aug. 6, 2013, which claims the benefit of U.S. Provisional Ser. No. 61/195,983 filed Oct. 14, 2008, the disclosures of all of which applications are herewith incorporated by reference in their entirety.

BACKGROUND OF THE INVENTION

The present invention relates generally to (i) linear variable differential transformers (LVDTs), devices that convert very small mechanical displacements, as small as those in the sub-nanometer level, into differential voltages (and vice versa), and (ii) integrating LVDTs into the structure of a scanning probe device such as the atomic force microscope (AFM) so that certain movements of the device may be conveniently sensed and corrected if desired.

FIG. 1 shows an LVDT according to U.S. Pat. No. 7,038,443, Linear Variable Differential Transformers for High Precision Position Measurements, by some of the same inventors as here. This LVDT reflects the basic idea of these devices in the prior art that the mutual inductances between a moving primary and two secondaries change as a function of the position of a moving part. In commercial LVDTs available the LVDT of U.S. Pat. No. 7,038,443, the moving part was a ferromagnetic core and the positions of the primary and the secondaries was fixed. However, because of the use of non-ferromagnetic materials in its construction, the fact that the primary moves rather than being stationary and the advanced signal conditioning electronics controlling its operation, the LVDT of U.S. Pat. No. 7,038,443 provides sensitivity unavailable in previous LVDTs. The FIG. 1 LVDT comprises a movable non-ferromagnetic coil form 114 around which a primary coil 115 is wound and a stationary non-ferromagnetic coil form or forms 110 around which two secondary coils 103 and 104 are wound. The coil forms can be made of plastic or paramagnetic material. The primary coil form 114 is mechanically connected to the object of interest (not shown) by a shaft 108. The shaft 108 can transmit displacements of the object of interest on the order of microns or smaller. Alternatively the primary coil form could be stationary and the secondary coil forms could be movable with the object of interest mechanically connected to the secondary coil forms. The functionality of such a LVDT would be equivalent to that shown in FIG. 1.

Excitation electronics 111 produce the current driving the primary coil 115. As the position of the object of interest attached to shaft 108 changes, and therefore the position of the primary coil 115 with respect to the secondary coils 103 and 104 changes, the flux coupled to the two secondaries, 103 and 104, also changes. These voltages are amplified with a differential amplifier 106 and converted to a voltage proportional to the core displacement by the signal conditioning electronics 112. For small displacements, the signal is linear. The use of plastic or paramagnetic material in the construction of the FIG. 1 LVDT lowers the sensitivity gain that would be provided by high permeability magnetic material, but eliminates Barkhausen noise. The elimination of Barkhausen noise permits the output of the excitation electronics 111 to be raised without causing a corresponding increase in output noise, thus increasing the sensitivity of the LVDT.

FIG. 2 shows a more detailed depiction of the digital excitation and signal conditioning electronics for the FIG. 1 LVDT, taken from US Patent App. Pub. No. US20040056653, Linear Variable Differential Transformer with Digital Electronics, by some of the same inventors as here. The FIG. 2 digital excitation and signal conditioning electronics are based on a digitally generated square wave, which when filtered produces a sine wave drive signal with more precisely defined amplitude and frequency, and lower noise, than a sine wave drive signal generated by an analog sine wave generator. This digitally generated square wave originates in a microprocessor 280. The microprocessor could be a digital signal processor, a microcontroller or other similar microprocessors known to those skilled in the art. The square wave in turn is filtered by a low pass filter 224 that effectively removes all the harmonics of the square wave above the fundamental, resulting in a pure sine wave. The filter is optimized to be stable with respect to variations in temperature. The sine wave in turn is amplified by a current buffer 225 that directly drives the LVDT primary 215. A sine wave generated by this excitation circuit has nearly perfect frequency and amplitude stability and has a high signal to noise ratio.

In the embodiment of the excitation and signal conditioning electronics depicted in FIG. 2, one lead from each of the secondaries 103 and 104 is grounded and the other is connected to a high precision, low noise differential amplifier 106 which subtracts the input of one secondary from the input of the other and amplifies the difference mode signal. The differential amplifier is designed to produce low noise when coupled to a low impedance input source (such as a coil). The signal from the differential amplifier 106 is input to a buffer amplifier 231 and an inverting buffer amplifier 232. The output of the buffer amplifier 231 is fed into a normally closed input of an analog switch 233 while the output of the inverting buffer amplifier 232 is fed into a normally open input of the same switch. This arrangement could be reversed with no loss of functionality as long as the two inputs of the switch are set so that one input is open when the other input is closed. The action of the analog switch 233 is controlled by a square wave originating in the microprocessor 280 which can be phase shifted relative to the square wave also originating in the microprocessor 280 which (when filtered and amplified) drives the LVDT primary 215. Alternatively to a phase shift relative to the primary drive square wave originating in the microprocessor 280, it is possible to shift the phase relative to the signal going into the primary drive current buffer 225. All that matters is that the phase of the primary drive relative to the phase of the reference square wave is adjustable. Preferably, the opening of one input which occurs with the closing of the other input of switch 233 is 90 degrees out of phase with the output signal from amplifier 106. The output of the analog switch 233 is fed into a stable, low noise, low pass filter 234. The output of this filter provides a signal proportional to the position of the moving primary coil 215.

Scanning probe devices such as the atomic force microscope (AFM) can be used to obtain an image or other information indicative of the features of a wide range of materials with molecular and even atomic level resolution. As the demand for resolution has increased, requiring the measurement of decreasingly smaller forces and movements free of noise artifacts, the old generations of these devices are made obsolete. The preferable approach is a new device that addresses the central issue of measuring small forces and movements with minimal noise.

For the sake of convenience, the current description focuses on systems and techniques that may be realized in a particular embodiment of scanning probe devices, the atomic force microscope (AFM). Scanning probe devices include such instruments as AFMs, scanning tunneling microscopes (STMs), 3D molecular force probe instruments, high-resolution profilometers (including mechanical stylus profilometers), surface modification instruments, NanoIndenters, chemical or biological sensing probes, instruments for electrical measurements and micro-actuated devices. The systems and techniques described herein may be realized in such other scanning probe devices, as well as devices other than scanning probe devices which require precision, low noise displacement measurements.

An AFM is a device which obtains topographical information (and/or other sample characteristics) while scanning (e.g., rastering) a sharp tip on the end of a probe relative to the surface of the sample. The information and characteristics are obtained by detecting changes in the deflection or oscillation of the probe (e.g., by detecting small changes in amplitude, deflection, phase, frequency, etc.) and using feedback to return the system to a reference state. By scanning the tip relative to the sample, a "map" of the sample topography or other characteristics may be obtained.

Changes in the deflection or oscillation of the probe are typically detected by an optical lever arrangement whereby a light beam is directed onto the side of the probe opposite the tip. The beam reflected from the probe illuminates a position sensitive detector (PSD). As the deflection or oscillation of the probe changes, the position of the reflected spot on the PSD also changes, causing a change in the output from the PSD. Changes in the deflection or oscillation of the probe are typically made to trigger a change in the vertical position of the base of the probe relative to the sample (referred to herein as a change in the Z position, where Z is generally orthogonal to the XY plane defined by the sample), in order to maintain the deflection or oscillation at a constant pre-set value. It is this feedback that is typically used to generate an AFM image.

AFMs can be operated in a number of different sample characterization modes, including contact modes where the tip of the probe is in constant contact with the sample surface, and AC modes where the tip makes no contact or only intermittent contact with the surface.

Actuators are commonly used in AFMs, for example to raster the probe over the sample surface or to change the position of the base of the probe relative to the sample surface. The purpose of actuators is to provide relative movement between different parts of the AFM; for example, between the probe and the sample. For different purposes and different results, it may be useful to actuate the sample or the probe or some combination of both. Sensors are also commonly used in AFMs. They are used to detect movement, position, or other attributes of various components of the AFM, including movement created by actuators.

For the purposes of this specification, unless otherwise indicated (i) the term "actuator" refers to a broad array of devices that convert input signals into physical motion, including piezo activated flexures; piezo tubes; piezo stacks, blocks, bimorphs and unimorphs; linear motors; electrostrictive actuators; electrostatic motors; capacitive motors; voice coil actuators; and magnetostrictive actuators, and (ii) the term "sensor" or "position sensor" refers to a device that converts a physical quantity such as displacement, velocity or acceleration into one or more signals such as an electrical signal, and vice versa, including optical deflection detectors (including those referred to above as a PSD), capacitive sensors, inductive sensors (including eddy current sensors), differential transformers (such as described in U.S. Pat. No. 7,038,443 and co-pending applications US Patent App. Pub. No. US20020175677, Linear Variable Differential Transformers for High Precision Position Measurements, and US20040056653, Linear Variable Differential Transformer with Digital Electronics, which are hereby incorporated by reference in their entirety), variable reluctance sensors, optical interferometry, strain gages, piezo sensors and magnetostrictive and electrostrictive sensors.

SUMMARY OF THE INVENTION

Embodiments describe an LVDT and a method of operating an LVDT.

DESCRIPTION OF THE PREFERRED EMBODIMENTS

A piezo activated flexure may be used to move the sample in the X and Y directions relative to the tip of the probe of an AFM, that is to scan the sample in the XY plane, using a XY positioning stage like that shown in FIG. 20 of U.S. Pat. No. 7,038,443, by some of the same inventors as here. Similarly, as shown in FIG. 19 of that patent, such a flexure may be used to change the vertical position of the base of the probe relative to the sample (that is along the Z axis) using a Z positioning stage in order to maintain the deflection or oscillation of the probe tip at a constant pre-set value. In both situations a LVDT like that disclosed in U.S. Pat. No. 7,038,443 may be used to sense movement in the X, Y and Z directions and to make any desired corrections. For this purpose, what is of interest, the X position and the Y position of the XY positioning stage, and the Z position of the Z positioning stage, is each mechanically connected to a primary coil form 114 of a separate LVDT via the shaft 108 of the LVDT in question and each primary coil form therefore moves in tandem with any movement of the X position, Y position or Z position, as the case may be. The secondary coil forms 110 of each such LVDT in turn are fastened to the frame of the XY positioning stage in the case of the LVDTs pertaining to the X position or the Y position and to the frame of the AFM in the case of the LVDT pertaining to the Z position. The secondary coil forms 110 of each such LVDT therefore remain stationary relative to its primary coil form 114.

The present invention uses piezo activated flexures to move the sample in the X, Y and Z directions relative to the tip of the probe of an AFM, that is to scan the sample in the XY plane, and to move the vertical position of the sample relative to the base of the probe, that is to move the sample or base of the probe in the Z plane, in order to maintain the deflection or oscillation of the probe tip at a constant pre-set value. These piezo activated flexures are part of a scanner module of an AFM. An AFM for which these piezo activated flexures may be used is described in a co-pending application, US patent application Ser. No. 12/587,943, entitled Modular Atomic Force Microscope, by some of the same inventors.

Figure 3:
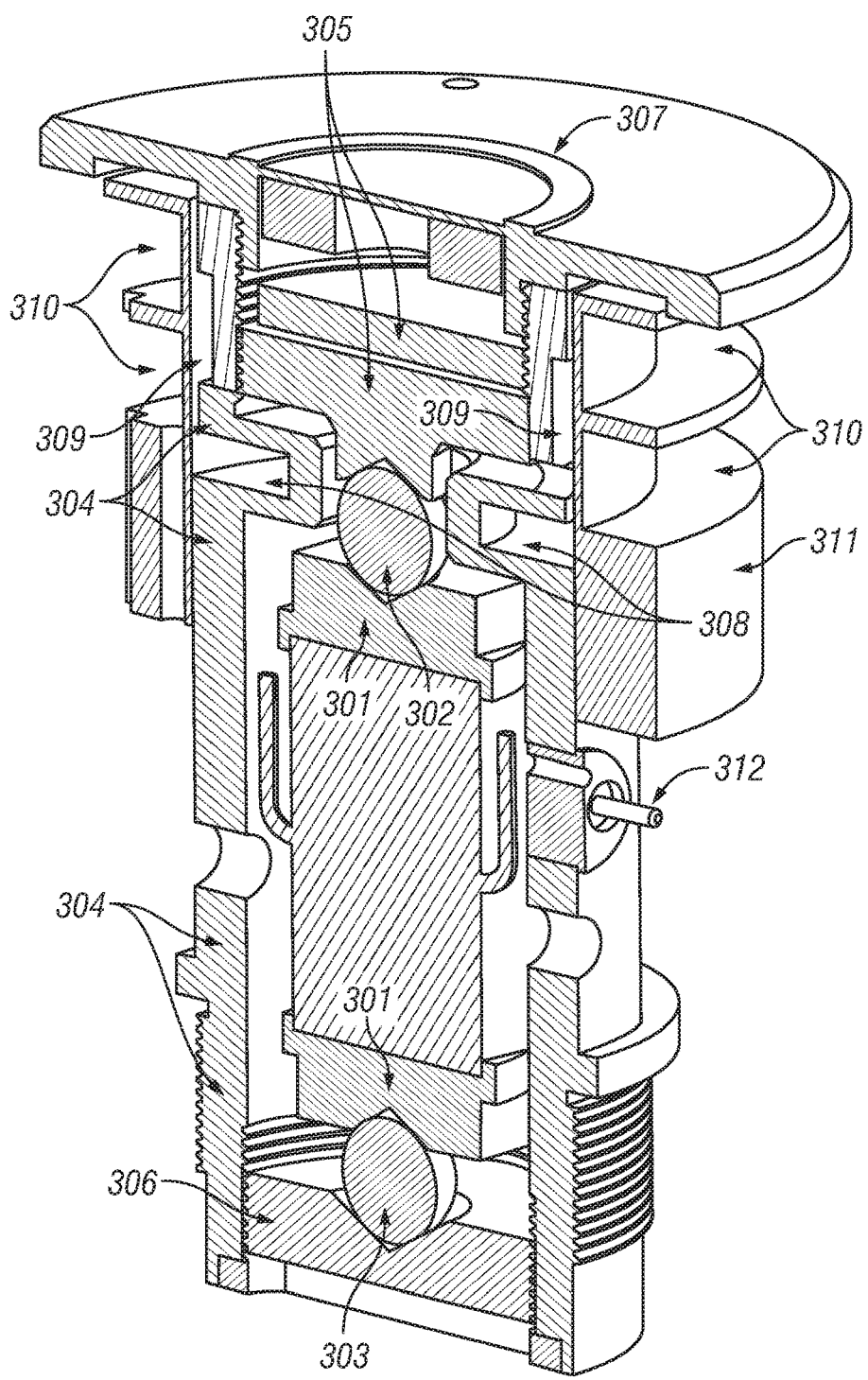
FIG. 3: Preferred embodiment of integrated piezo flexure and LVDT.

FIG. 3 depicts one of these piezo activated flexures, the one that is used to change the vertical position of the sample relative to the base of the probe. Piezo activated flexures similar to that depicted in FIG. 3 may be used to change to scan the sample in the XY plane. The piezo 301 of FIG. 3 is of a stack design known to those versed in the art with top and bottom indentations to accommodate a top ball bearing 302 and a bottom ball bearing 303. The flexure 304 is of a tube design with interior threads to provide for a threaded disk insert (or contiguous disk inserts) at the top 305, together with a threaded sample support plate 307, and another threaded disk insert at the bottom 306. The disk inserts have top and bottom indentations corresponding to those of the piezo 301 to accommodate the top and bottom ball bearings 302 and 303. The interior threads of the flexure 304 and the threaded disk inserts 305 and 306 permit the piezo 301 via the ball bearings 302 and 303 to be locked into place within the flexure 304.

The bottom disk insert 306 of the flexure 304 taken together with the design of the flexure itself serve as a cap and permits very little motion along the Z axis in the direction of the bottom of the flexure. The top disk insert 305 again taken together with the design of the flexure itself permits free movement of the flexure 304 along the Z axis in the direction of the top of the flexure in accordance with vertical expansion and contraction of the piezo 301. The cut-outs or recesses 308 in the flexure 304 constrain this movement to the Z plane, and permit very little motion in the X and Y planes.

When the piezo 301 is locked into place within the flexure 304 the top disk insert 305 is tightened somewhat more than is necessary to lock the piezo in place as a means of preloading the flexure 304. The cut-outs or recesses 308 in the flexure 304 transform this additional tightening into movement of the flexure, together with the sample support plate 307 and thereby the sample (not shown), along the Z axis in the direction of the top of the flexure. When the piezo 301 is contracted (using the appropriate electrical charge) the cut-outs or recesses 308 of the flexure 304 transform this contraction into movement of the portion of the flexure 304 above the cut-outs or recesses 308, together with the sample support plate 307 and thereby the sample, along the Z axis in the direction of the bottom of the flexure. When the piezo 301 is expanded (using the appropriate electrical charge) the cut-outs or recesses 308 of the flexure 304 transform this expansion into movement of the portion of the flexure 304 above the cut-outs or recesses 308, together with the sample support plate 307 and the sample, along the Z axis in the direction of the top of the flexure. As noted this motion is accompanied by very little motion in the X and Y planes.

As already noted, LVDTs like those disclosed in U.S. Pat. No. 7,038,443 may be used in an AFM to sense and correct movement in the X, Y or Z directions when the sample is scanned in the XY plane or when the vertical position of the sample relative to the base of the probe is moved in the Z plane. As shown in that patent, this is achieved by mechanically connecting the primary and secondaries of LVDTs to the parts of the AFM relevant for the purpose.

The present invention uses LVDTs to sense and correct movement in the X, Y or Z directions in an AFM, but in a very different way than shown in U.S. Pat. No. 7,038,443. Instead of mechanically connecting the primary and secondary coil forms of LVDTs to the parts of the AFM relevant for the purpose, here the primary and secondary coil forms are integral to the parts themselves. As shown in FIG. 3, a channel 309 which serves as the primary coil form for the LVDT is formed into the top of the flexure 304 just above the cut-outs or recesses 308 in the flexure 304. As described above this portion of the flexure, and therefore the channel 309, moves as the piezo 301 is contracted or expanded. Similarly a pair of channels 310 which serve as the secondary coil forms for the LVDT are formed into a stationary sleeve 311 which is fastened to the flexure 304 below the cut-outs or recesses 308. As described above the portion of the flexure 304 to which the sleeve 311 is attached, and therefore the sleeve, does not move as the piezo 301 is contracted or expanded.

Within the limits imposed by the requirement for preloading the flexure 304, loosening or tightening the top disk insert 305 can be used to center the channel 309 which serves as the primary coil form for the LVDT relative to the channels 310 which serve as the secondary coil forms.

The flexure 304 provides conduits whereby electrical connections may be established with the primary coil, the secondary coils and the piezo 301. FIG. 3 shows the exterior portion of one of these conduits 312.

As noted in U.S. Pat. No. 7,038,443 non-ferromagnetic coil forms are an important contributor to making a sensitive LVDT. For this purpose, the coil forms could be made of plastic or paramagnetic material. In the present invention the flexure 304, in which the channel 309 which serves as the primary coil form is integrated, is preferably fabricated from a high-yield-stress non-ferromagnetic aluminum such as 7075 aluminum. Alternatively they could be fabricated from a ceramic material. The stationary sleeve 311, in which the pair of channels 310 which serve as the secondary coil forms are integrated, is preferably fabricated from a plastic material such as PEEK. Again, they could also be fabricated from a ceramic material.

Figure 1:
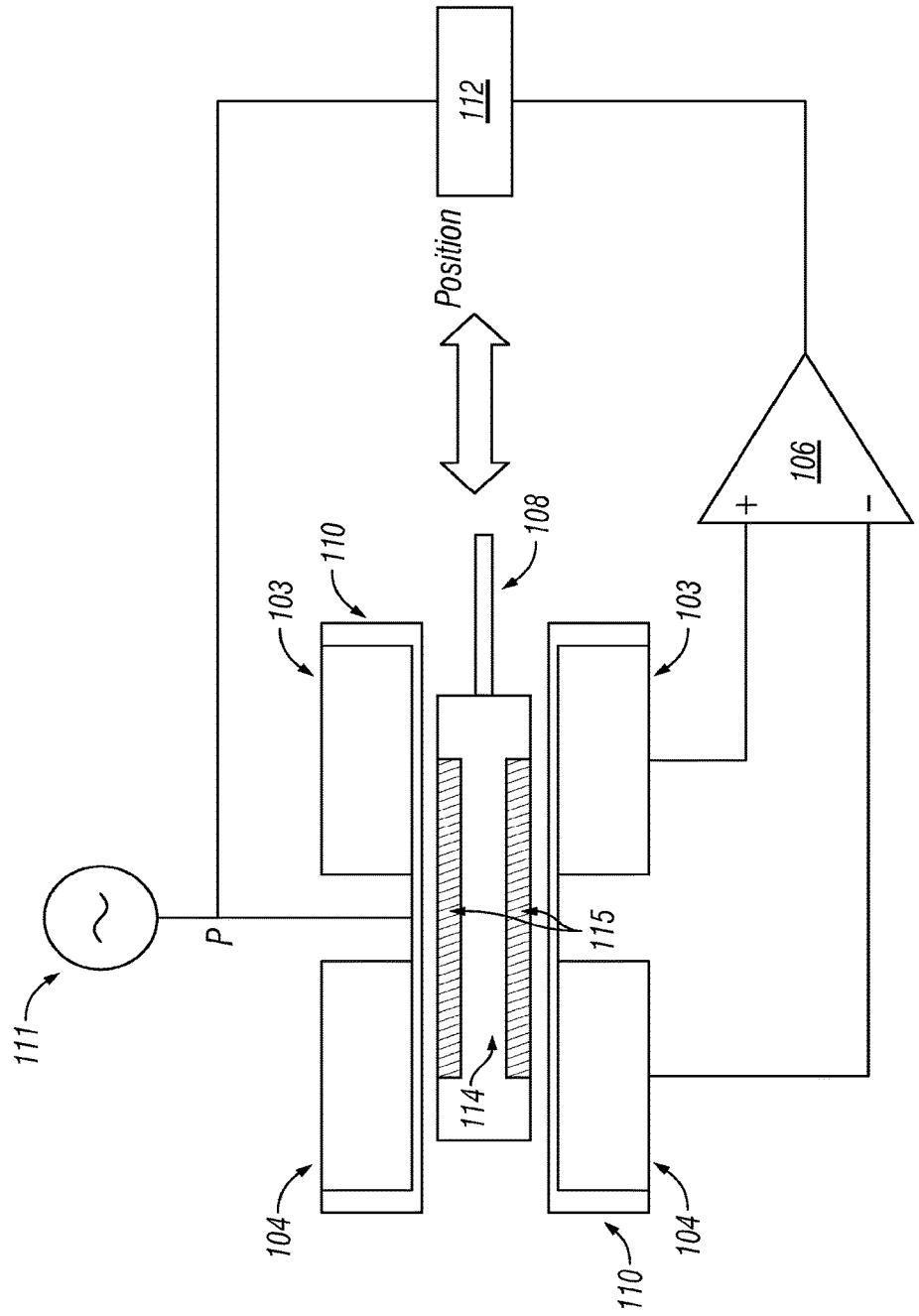
FIG. 1: Prior art showing a LVDT with a low-permeability core and a moving primary.
Figure 4:
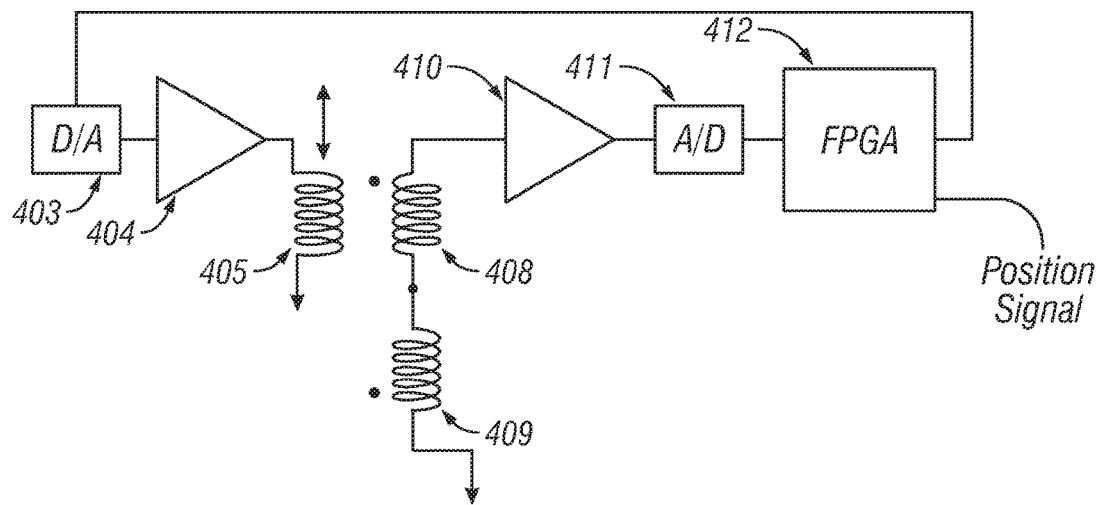
FIG. 4: Preferred embodiment of digital excitation and signal conditioning electronics for integrated piezo flexure and LVDT.

FIG. 4 shows a preferred embodiment of digital excitation and signal conditioning electronics for the LVDT of the present invention in which the primary and secondary coil forms of the LVDT are integral to the relevant moving parts of a piezo activated flexure like that depicted in FIG. 3 and the coil forms are formed from a non-ferromagnetic material. These electronics may be used with LVDTs of other designs, for example the LVDT of FIG. 1 where they would replace the digital excitation and signal conditioning electronics depicted in FIG. 2.

Figure 4A:
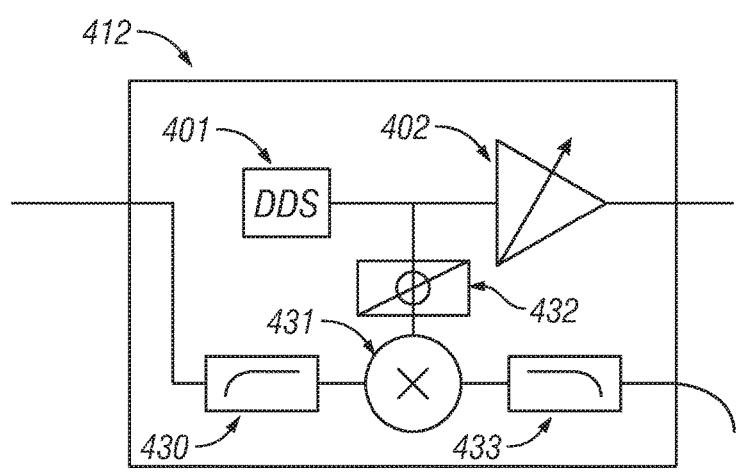
FIG. 4A: Preferred embodiment of field programmable gate array for digital excitation and signal conditioning electronics of FIG. 4.

The embodiment of the digital excitation and signal conditioning electronics of FIG. 4 are based on a digitally generated sine wave drive signal with much more precisely defined amplitude and frequency, and lower noise, than a sine wave generated by an analog sine wave generator. This sine wave drive signal originates in a direct digital synthesizer 401, implemented within the field programmable gate array 412, some of the components of which are shown separately in FIG. 4A. The sine wave is then routed though a digital gain stage 402, also implemented within the FPGA 412, which permits the user to control the amplitude of the wave. At this point the sine wave has the following form:

$$A \sin \omega t$$

Figure 4B:
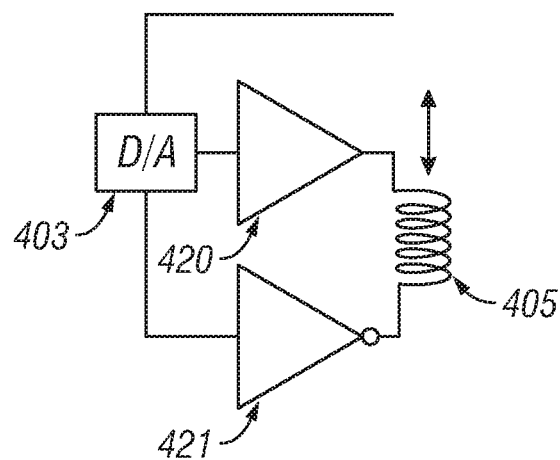
FIG. 4B: Alternative embodiment of primary drive of digital excitation and signal conditioning electronics of FIG. 4.

The sine wave is then converted to analog form by a digital to analog converter 403 and amplified by a buffer 404 that directly drives the LVDT primary 405 of the present invention typically at a +10V to −10V voltage range, but other voltages may be used. The voltages driving the primary 405 may be doubled through another embodiment depicted in FIG. 4B. In that embodiment, the output of the digital to analog converter 403 is split and sent both to a gain stage 420 and a negative gain stage 421. The output of each stage is in turn connected to one of the leads of the LVDT primary 405, and the primary is differentially driven at twice the original voltage range.

The signal conditioning electronics of the digital excitation and signal conditioning electronics for the LVDT of the present invention are depicted in FIG. 4. As shown there, one of the secondaries 408 and 409 may be wound in the opposite direction from the winding of the other and the adjoining leads from the oppositely wound secondaries wired together. The other lead from one of the secondaries, here secondary 409, is grounded and the other lead from the second secondary, here secondary 408, is connected to an analog gain stage 410.

Figure 4C:
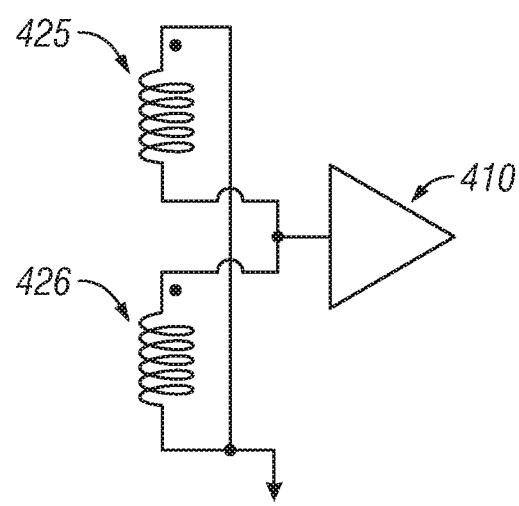
FIG. 4C: Alternative embodiment of wiring for secondary of digital excitation and signal conditioning electronics of FIG. 4.

FIG. 4C shows another equivalent arrangement of the secondaries 408 and 409 and the analog gain stage 410 of FIG. 4 where the secondary windings are wound in the same direction, but are wired to produce the same effect as with secondaries wound in opposite directions as in FIG. 4. Either arrangement offers a significant improvement in the signal-to-noise ratio of the signal conditioning electronics for the LVDT of the present invention relative to such electronics of other LVDTs, for example the electronics depicted in FIG. 2. One reason for this improvement is the self-cancelling feature of the arrangement. In the signal conditioning electronics of the FIG. 2 LVDT, the signal coupled to one secondary by the primary 215 is subtracted in the differential amplifier 106 from the signal coupled to the other secondary in order to determine a voltage proportional to the displacement of the primary coil form 114 and therefore the displacement of the object of interest which is mechanically connected to the coil form. Indeed the differential amplifier 106 is making this calculation even when the primary is centered exactly between the two secondaries and there is no displacement to measure. With the signal conditioning electronics for the LVDT of the present invention however the signal coupled to the secondaries 408 and 409 are wound or wired such that either the currents induced by the coupled signal in the case of the arrangement shown in FIG. 4 or the voltages so induced in the case of the arrangement shown in FIG. 4C oppose each other in the secondaries themselves, thereby obviating the need for a differential amplifier. This self-opposing phenomenon for example results in a zero signal from the secondaries 408 and 409 or 425 and 426, as the case may be, when the primary 405 is centered exactly between the two secondaries.

Figure 2:
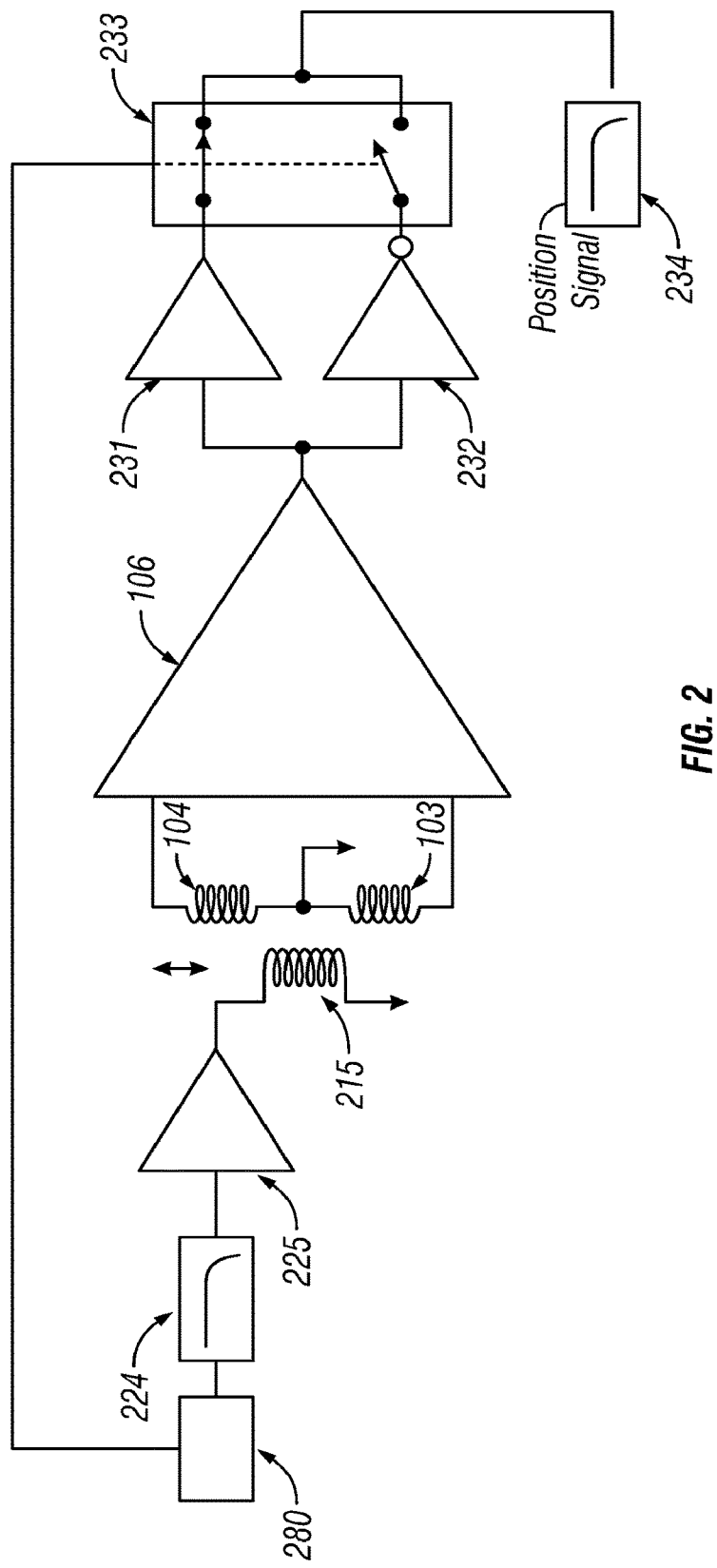
FIG. 2: Prior art showing excitation and signal conditioning electronics based on a synchronous analog switch.

The signal-to-noise ratio of the signal conditioning electronics for LVDTs using a differential amplifier 106 like that of the FIG. 2 LVDT is inherently lower than is desirable because of the voltage rails that are part of such amplifiers. These rails limit the voltages in the secondaries that can be accommodated by the amplifier to low levels and thus limit the possible signal-to-noise ratio. Furthermore as the voltage in the secondaries rises, so does Johnson noise, and therefore the signal-to-noise ratio of the signal conditioning electronics declines.

The self-opposing phenomenon of the signal conditioning electronics for the LVDT of the present invention makes it possible to use much higher voltages and thus boost the signal-to-noise ratio. One method of doing this is to increase the voltage (or current) driving the primary 405 and therefore the voltages (or currents) induced in the secondaries 408 and 409 or 425 and 426, as the case may be. As noted above, the embodiment depicted in FIG. 4B shows a method for doubling the primary voltage (or current) that is used. Another method substantially increases the voltages (or currents) induced in the secondaries 408 and 409 or 425 and 426, as the case may be, by the voltage (or current) of the primary 405 by increasing the turns ratio of the secondaries relative to the primary. As is well known, the voltages (or currents) induced in the secondaries 408 and 409 or 425 and 426, as the case may be, can be increased many times over by this method. However, whether the voltages (or currents) induced in the secondaries 408 and 409 or 425 and 426, as the case may be, are increased by increasing the voltages (or currents) driving the primary 405 or by increasing the turns ratio of the secondaries relative to the primary, or both, the self-opposing phenomenon of the signal conditioning electronics for the LVDT of the present invention passes along to the gain stage 410 only the difference between the voltage (or current) induced in one secondary and that induced in the other. Thus, a large increase in the signal-to-noise-ratio may be obtained because the magnitude of the drive or the turns ratio of secondary to primary are no longer limited by the electronic input range of the differential amplifier imposed by its voltage rails.

As shown in FIG. 4, the signal conditioning electronics of the present invention routes the output from the secondaries 408 and 409 or 425 and 426, as the case may be, through an analog gain stage 410, at which point the output is a 125 kHz sine wave with the following form:

$$B \sin(\omega t + \Phi)$$

A typical operating frequency might be 125 kHz, although other frequencies could be used. This sine wave is then converted into digital form with an analog to digital converter 411 and sent to the FPGA 412, the components of which are shown separately in FIG. 4A. The digitized signal is then fed through a DC blocking filter 430, implemented within the FPGA 412, the output of which goes to a digital multiplier circuit 431, also implemented within the FPGA 412. The other input to the multiplier circuit 431 is the digital sine wave driving the LVDT primary 405 after its phase offset has been adjusted. As indicated above, this sine wave originates in the DDS 401, implemented within the FPGA 412. The phase offset of the digital sine wave driving the LVDT primary is adjusted by the phase offset adjustment circuit 432, also implemented within the FPGA 412. The output from the multiplier circuit 431 has the following form:

$$A \sin(\omega t) \times B \sin(\omega t + \Phi) = (A \times B)/2(\sin(2\omega t + \Phi) + \sin \Phi)$$

In order to increase the resolution provided by the signal conditioning electronics for the LVDT of the present invention, the ADC 411 used to covert the sine wave output from the secondaries 408 and 409 or 425 and 426, as the case may be, is preferably at least an 18-bit converter sampling at least at a 2 MHz rate. Using such an ADC, this output, which for example is a sine wave at 125 kHz after having been passed through the analog gain stage 410 which intervenes between the secondaries 408 and 409 or 425 and 426, as the case may be, and the ADC 411, is sampled at a rate of 16 samples per cycle, several times the minimum rate required to capture a sine wave digitally. However the 18-bit resolution for each sample provided by the ADC 411 is insufficient to overcome quantization effects and measure displacement at the subnanometer dynamic ranges required for the LVDT of the present invention. The solution to this difficulty is found in the fact that the ADC 411 is sampling at a 2 MHz rate, a rate much faster than the rate required for correcting movement of the piezo flexure of the present invention. Accordingly, some samples are used to create additional resolution of the sine wave, a result that may be referred to as bit growth. The output of the ADC 411 sent to the FPGA 412, therefore, is the sine wave output from the secondaries 408 and 409 or 425 and 426, as the case may be, in high resolution digital form.

The output from the multiplier circuit 431 is routed through a low pass filter 433 which filters out the sin (2 ωt+Φ) term, leaving the dc term (A×B)/2 sin Φ. This dc term of the signal is proportional to the change in position of the piezo flexure of the present invention and may be used to correct that position to the position desired.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method, comprising:
   placing a sample to be tested on a top surface of one part of a housing;
   moving said top surface with the sample to be tested relative to another part of the housing, where said one part of said housing is movable relative to the another part of the housing, and where said moving is in a z-axis direction substantially perpendicular to said top surface and where said moving in the z-axis direction uses a flexure to change a vertical position of the top surface; and
   differentially detecting said moving of said top surface with the sample to be tested relative to the another part of the housing and producing an output signal indicative thereof,
   wherein said top surface includes a screwable connection part which allows said flexure to be preloaded.

2. A detector, comprising:
   a housing, having a top surface that holds a sample to be tested on one part of the top surface, and having and side surfaces that are perpendicular to said top surface;
   said top surface controlled to move, by actuating a moving part to move said top surface with the sample held on the top surface,
   said moving part moving one part of the housing relative to another part of the housing when actuated, where said one part moves in a z-axis direction substantially perpendicular to said top surface; and
   a differential detector, differentially detecting movement of said one part with the sample to be tested on said one part of the housing relative to the housing and producing an output signal indicative thereof, wherein said one part of said housing includes an energized primary coil wound on a primary coil surface that is substantially perpendicular to said top surface, and said another part of said housing includes first and second parts of a secondary coil wound on a secondary coil surface that is substantially perpendicular to said top surface.

3. The detector as in claim 2, wherein said secondary coil surface includes said side surfaces of said housing.

4. The detector as in claim 2, wherein said sample is moved on said top surface with the sample to be tested in x and y directions that are substantially perpendicular to each other and parallel to said top surface, and where a separation is maintained between a probe and said sample to allow room for movement in said z-axis direction, wherein said one part of said housing includes an energized primary coil wound on a primary coil surface that is substantially perpendicular to said top surface, and said another part of said housing includes first and second parts of a secondary coil wound on a secondary coil surface that is substantially perpendicular to said top surface, and separated from said primary coil surface in said x and y directions.

5. The detector as in claim 4, wherein said secondary coil surface includes said side surfaces of said housing.

6. The detector as in claim 4, further comprising electrically connecting said primary and secondary coils through a conduit in said housing.

7. The detector as in claim 6, wherein said differential detector has connections to first and second parts of said secondary coil.

8. The detector as in claim 2, further comprising electrically connecting said primary and secondary coils through a conduit in said housing.

9. The detector as in claim 2, wherein said differential detector connects to first and second portions of said secondary coil.

10. The detector as in claim 2, wherein said moving part is a piezo-driven flexure, where said movement is in a z-axis direction substantially perpendicular to said top surface and moves said top surface with the sample to be tested relative to another part of the housing.

11. The detector as in claim 2, wherein said housing includes a flexure that has a plurality of surfaces which flex relative to one another based on movement of the sample, and which, when flexing, cause movement between said primary coil and said secondary coil, said movement being constrained to the z-axis direction with very little motion in the direction of x and y axes.

12. A device as in claim 11, wherein said top surface includes a screwable connection part which allows said flexure to be preloaded.

13. A device as in claim 12, wherein said top surface is a spring-loaded surface with the sample to be tested, where said top surface is moved relative to another part of the housing by a piezo-driven flexure, where said movement is in a z-axis direction substantially perpendicular to said top surface.

14. A transformer device, comprising:
   a housing, having a first surface holding a sample, and said housing having structure allowing said sample to move relative to said housing along a first axis, and said housing having second and third coaxially located surfaces, said second surface allowing winding a primary coil thereon, and said third surface allowing winding of first and second parts of a secondary coil thereon, and said second and third surfaces being movable relative to each other in a substantially parallel direction to one another along a second axis, where movement along the second axis being a function of the movement of said sample along the first axis based on movement of said sample; and
   wherein said first surface is a spring-loaded surface, and wherein said spring loaded surface is moved relative to another part of the housing by a piezo-driven flexure, where said movement is in a z-axis direction substantially perpendicular to said spring loaded surface.

* * * * *